US011784979B2

(12) United States Patent
Pabijanskas et al.

(10) Patent No.: US 11,784,979 B2
(45) Date of Patent: *Oct. 10, 2023

(54) AUTHENTICATION SCHEME IN A VIRTUAL PRIVATE NETWORK

(71) Applicant: UAB 360 IT, Vilnius (LT)

(72) Inventors: Karolis Pabijanskas, Vilnius (LT); Andžej Valčik, Vilnius (LT); Ramūnas Keliuotis, Kaunas (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,948

(22) Filed: Nov. 22, 2021

(65) Prior Publication Data

US 2023/0155993 A1  May 18, 2023

Related U.S. Application Data

(63) Continuation of application No. 17/529,238, filed on Nov. 17, 2021, now Pat. No. 11,539,671.

(51) Int. Cl.
*H04L 9/40* (2022.01)
*H04L 9/32* (2006.01)

(52) U.S. Cl.
CPC ............ *H04L 63/0272* (2013.01); *H04L 9/32* (2013.01); *H04L 9/3271* (2013.01); *H04L 63/0428* (2013.01); *H04L 63/0435* (2013.01); *H04L 63/0442* (2013.01); *H04L 63/08* (2013.01)

(58) Field of Classification Search
CPC .. H04L 63/08; H04L 63/0272; H04L 63/0435
See application file for complete search history.

(56) References Cited

U.S. PATENT DOCUMENTS

| 9,712,503 B1* | 7/2017 | Ahmed .................. G06F 21/606 |
| 2007/0006296 A1* | 1/2007 | Nakhjiri .............. H04L 63/0272 726/15 |
| 2012/0159159 A1* | 6/2012 | Messerges .............. H04L 9/321 713/168 |
| 2015/0163222 A1* | 6/2015 | Pal ....................... H04L 63/0272 713/168 |
| 2018/0234289 A1* | 8/2018 | Chen ......................... H04L 1/18 |

* cited by examiner

*Primary Examiner* — Abiy Getachew
(74) *Attorney, Agent, or Firm* — The Pattani Law Group

(57) ABSTRACT

A method including configuring a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields; and configuring the first server to transmit, to the second server, a response based at least in part on determining the type associated with the encrypted authentication packet and on decrypting the one or more encrypted fields. Various other aspects are contemplated.

20 Claims, 9 Drawing Sheets

| 1 | 2 | 3 | 5 | 21 |
|---|---|---|---|---|
| Code | Identifier | Data Length | Authenticator | Payload |

Initial Authentication Packet

FIG. 3A

| 1 | 2 | 3 | 5 | 17 | 29 |
|---|---|---|---|---|---|
| Crypted Code | Identifier | New Data Length | Nonce | Authentication Tag | Crypted Payload |

Encrypted Authentication Packet

FIG. 3B

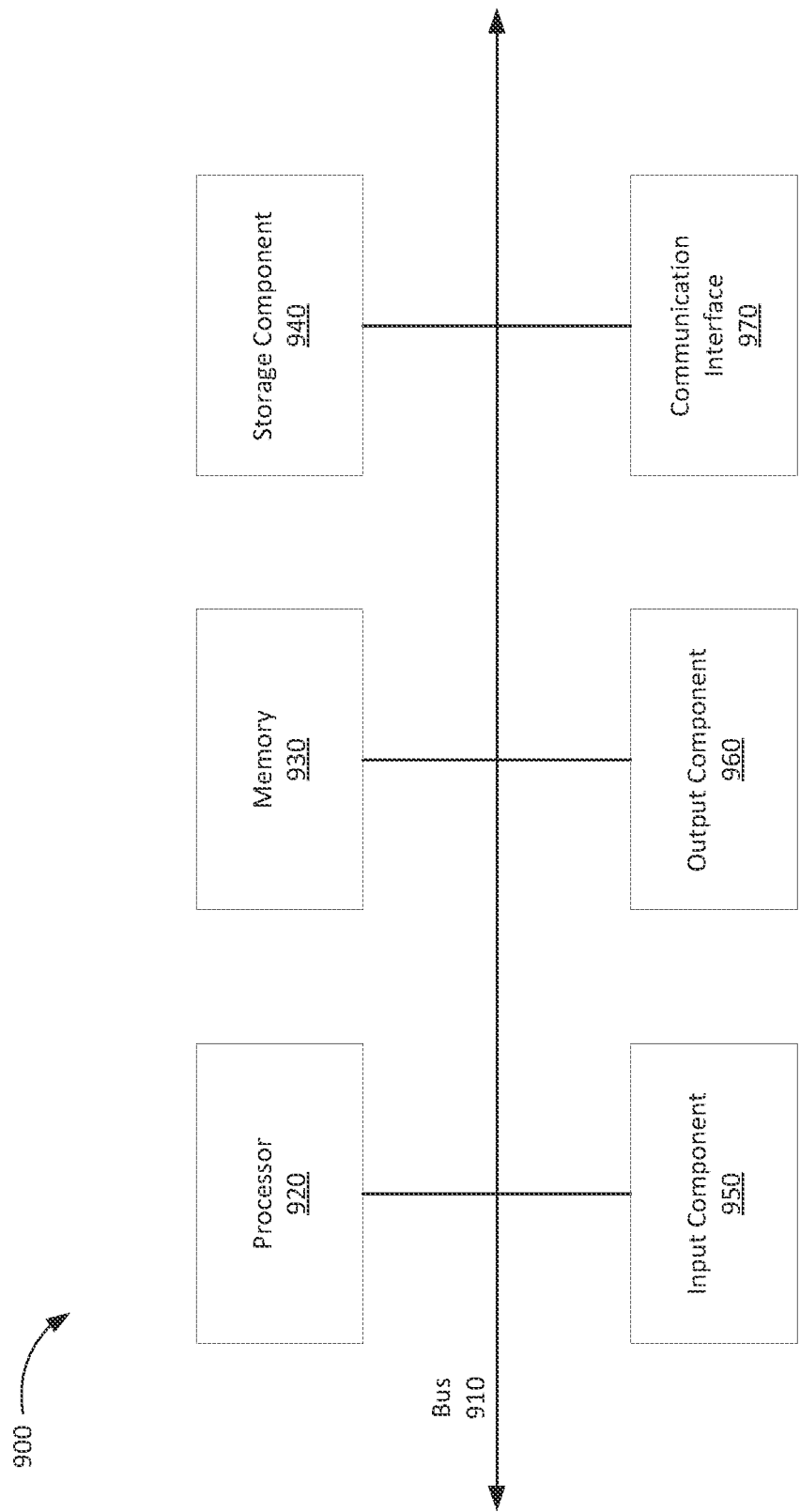

AUTHENTICATION SCHEME IN A VIRTUAL PRIVATE NETWORK

CROSS REFERENCE

This application is a continuation of U.S. Non-Provisional patent application Ser. No. 17/529,238, filed on Nov. 17, 2021, and titled "Authentication Scheme In A Virtual Private Network," the entire contents of which are incorporated herein by reference.

FIELD OF DISCLOSURE

Aspects of the present disclosure generally relate to use of computer hardware and/or software to manage data, and in particular to sharing access to data externally.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing, with the help of an encryption algorithm, the data from being in a transparently readable format to being in an encoded, unreadable format. Decryption may be associated with changing, with the help of a decryption algorithm, the data from being in the encoded, unreadable format to being in the transparently readable format. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available (e.g., through a directory), while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method in a virtual private network (VPN) environment, the method including determining, by a VPN server, an encrypted authentication packet based at least in part on utilizing an encryption key and a nonce to encrypt one or more fields of an initial authentication packet; transmitting, by the VPN server to an authentication server, the encrypted authentication packet to enable VPN authentication of a device requesting VPN services from the VPN server; determining, by the authentication server, a response regarding the VPN authentication based at least in part on decrypting the one or more fields utilizing a decryption key and the nonce; and transmitting, by the authentication server to the VPN server, the response regarding the VPN authentication.

In another aspect, the present disclosure contemplates a system associated with a VPN environment, the system comprising a VPN server configured to: determine an encrypted authentication packet based at least in part on utilizing an encryption key and a nonce to encrypt one or more fields of an initial authentication packet; and transmit, to an authentication server, the encrypted authentication packet to enable VPN authentication of a device requesting VPN services from the VPN server; and the authentication server configured to: determine a response regarding the VPN authentication based at least in part on decrypting the one or more fields utilizing a decryption key and the nonce; and transmit, to the VPN server, the response regarding the VPN authentication.

In another aspect, the present disclosure contemplates a non-transitory computer readable medium storing instructions, which when executed by a first processor associated with a VPN server, configure the first processor to: determine an encrypted authentication packet based at least in part on utilizing an encryption key and a nonce to encrypt one or more fields of an initial authentication packet; and transmit, to an authentication server, the encrypted authentication packet to enable VPN authentication of a device requesting VPN services from the VPN server; and when executed by a second processor associated with the authentication server, configure the second processor to: determine a response regarding the VPN authentication based at least in part on decrypting the one or more fields utilizing a decryption key and the nonce; and transmit, to the VPN server, the response regarding the VPN authentication.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
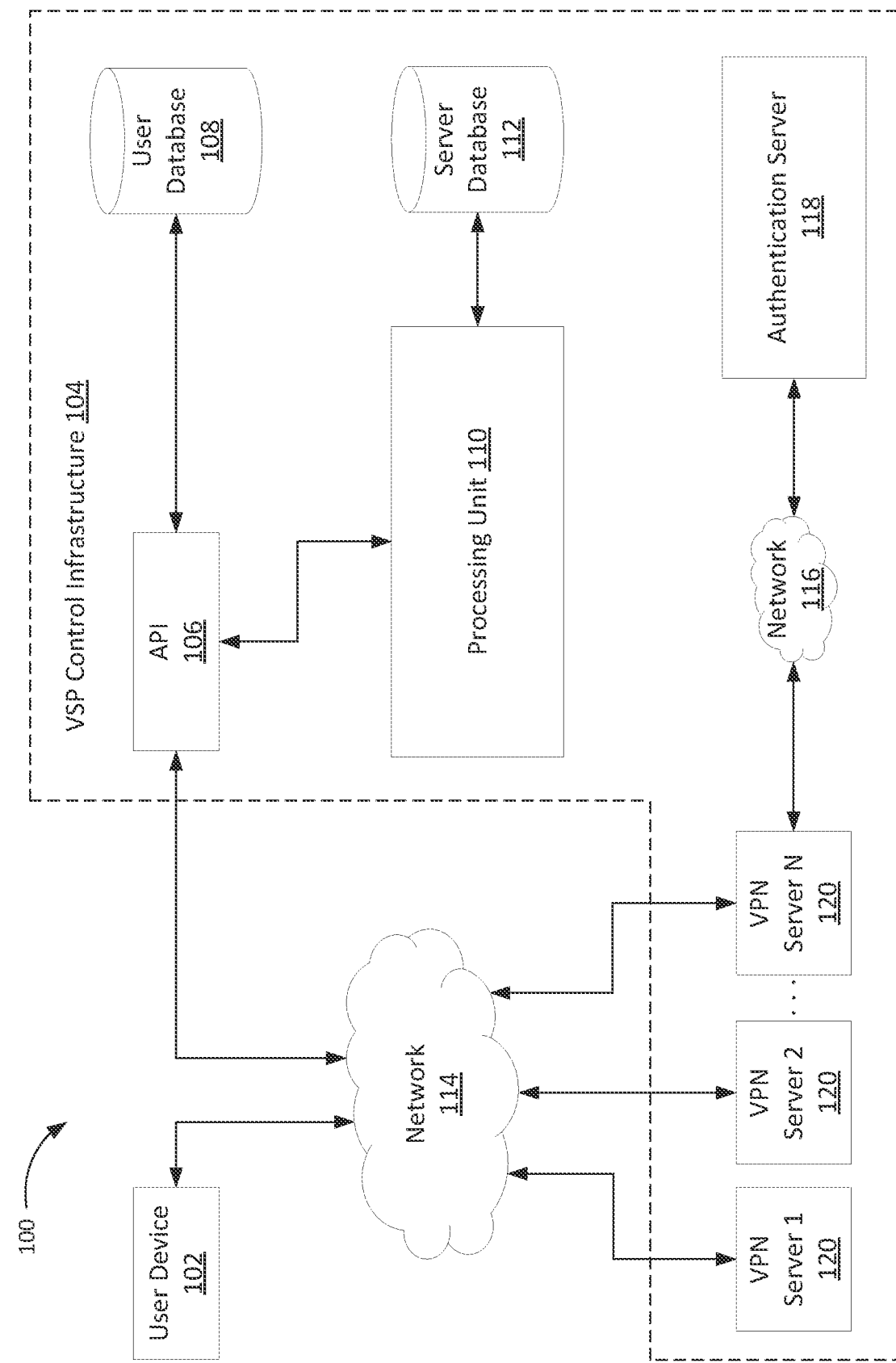

FIG. 1 is an illustration of an example system associated with an authentication scheme in a VPN, according to various aspects of the present disclosure.

Figure 2:
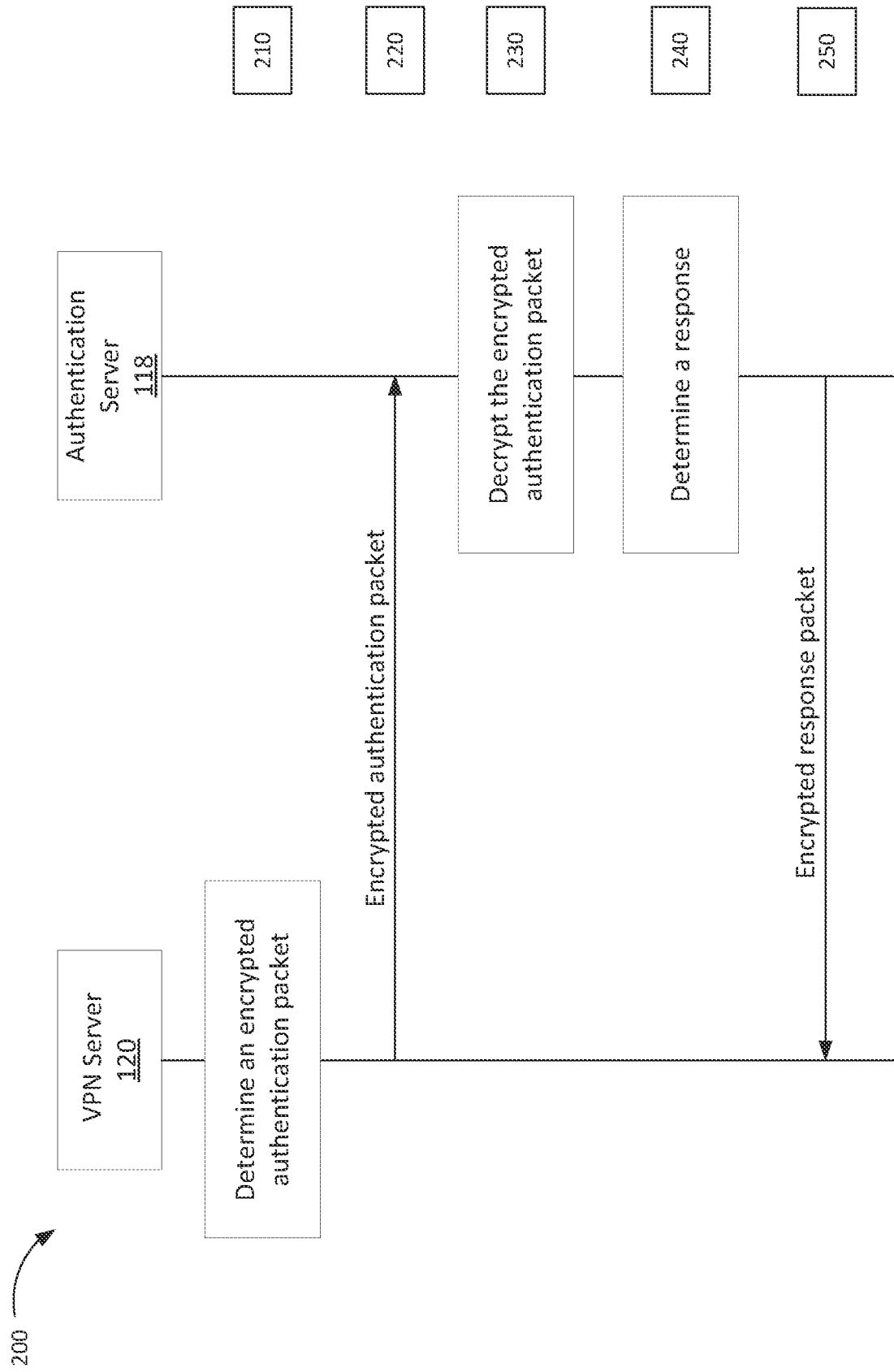

FIG. 2 is an illustration of an example flow associated with an authentication scheme in a VPN, according to various aspects of the present disclosure.

FIGS. 3A-B are illustrations of examples associated with an authentication scheme in a VPN, according to various aspects of the present disclosure.

Figure 4:
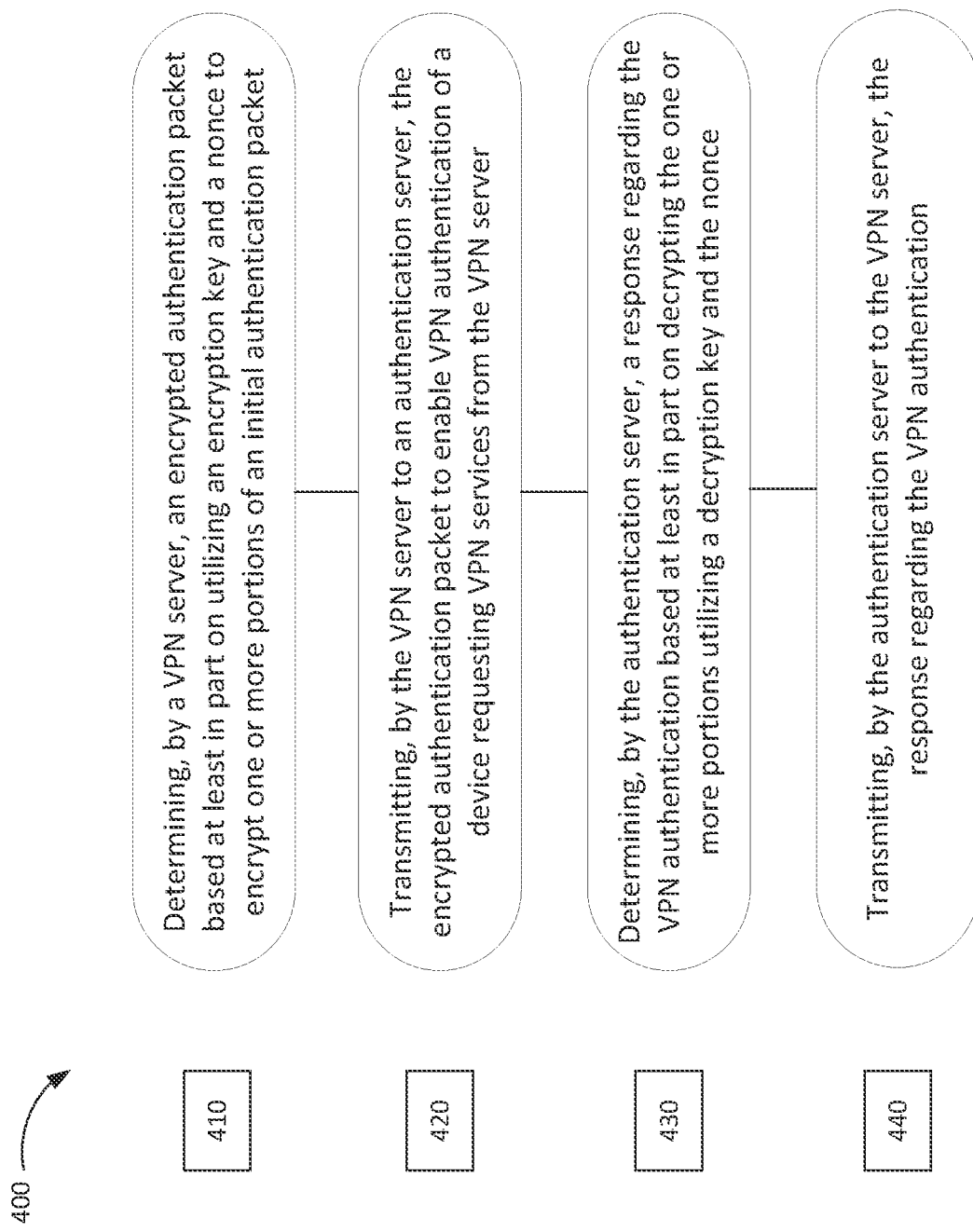

FIG. 4 is an illustration of an example process associated with an authentication scheme in a VPN, according to various aspects of the present disclosure.

Figure 5:
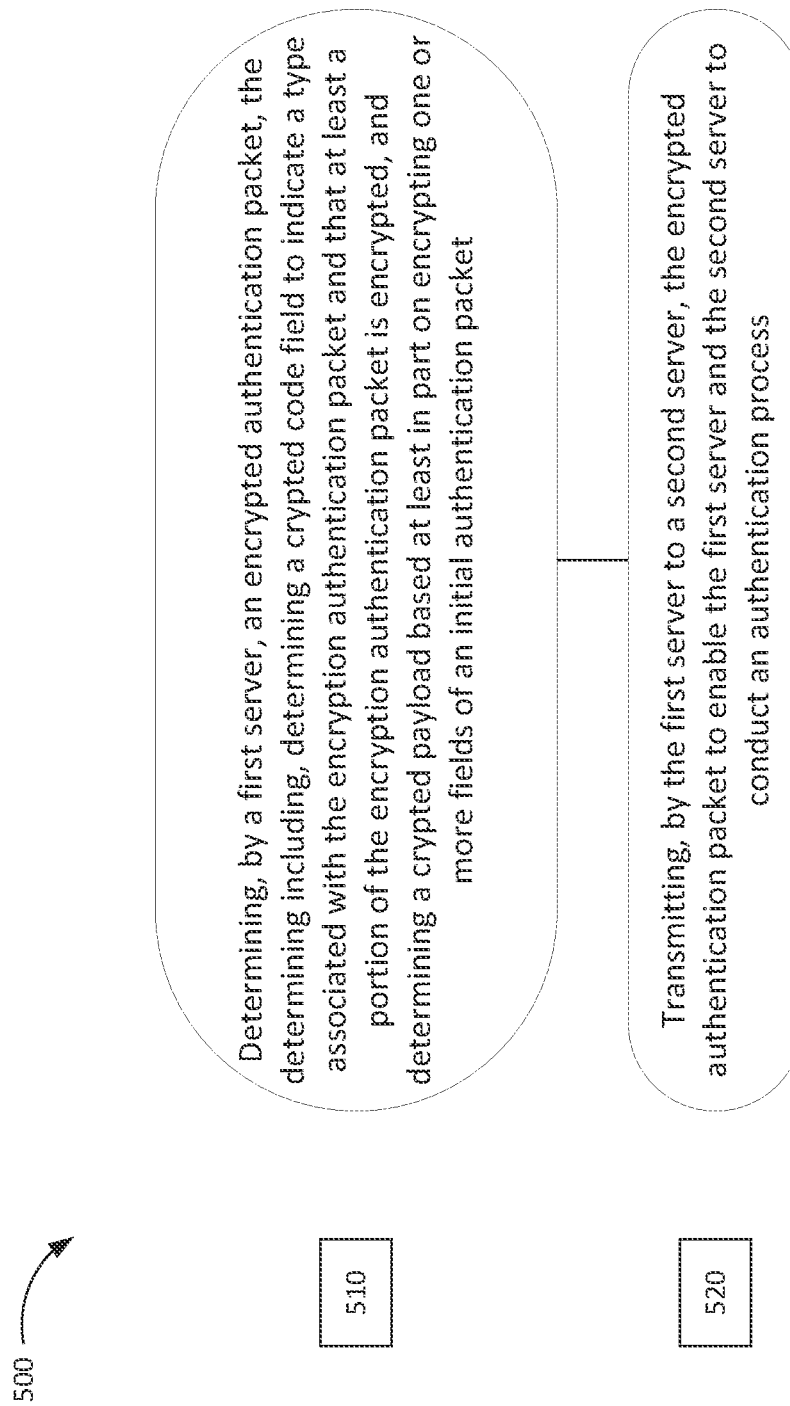

FIG. 5 is an illustration of an example process associated with an authentication scheme in a VPN, according to various aspects of the present disclosure.

Figure 6:
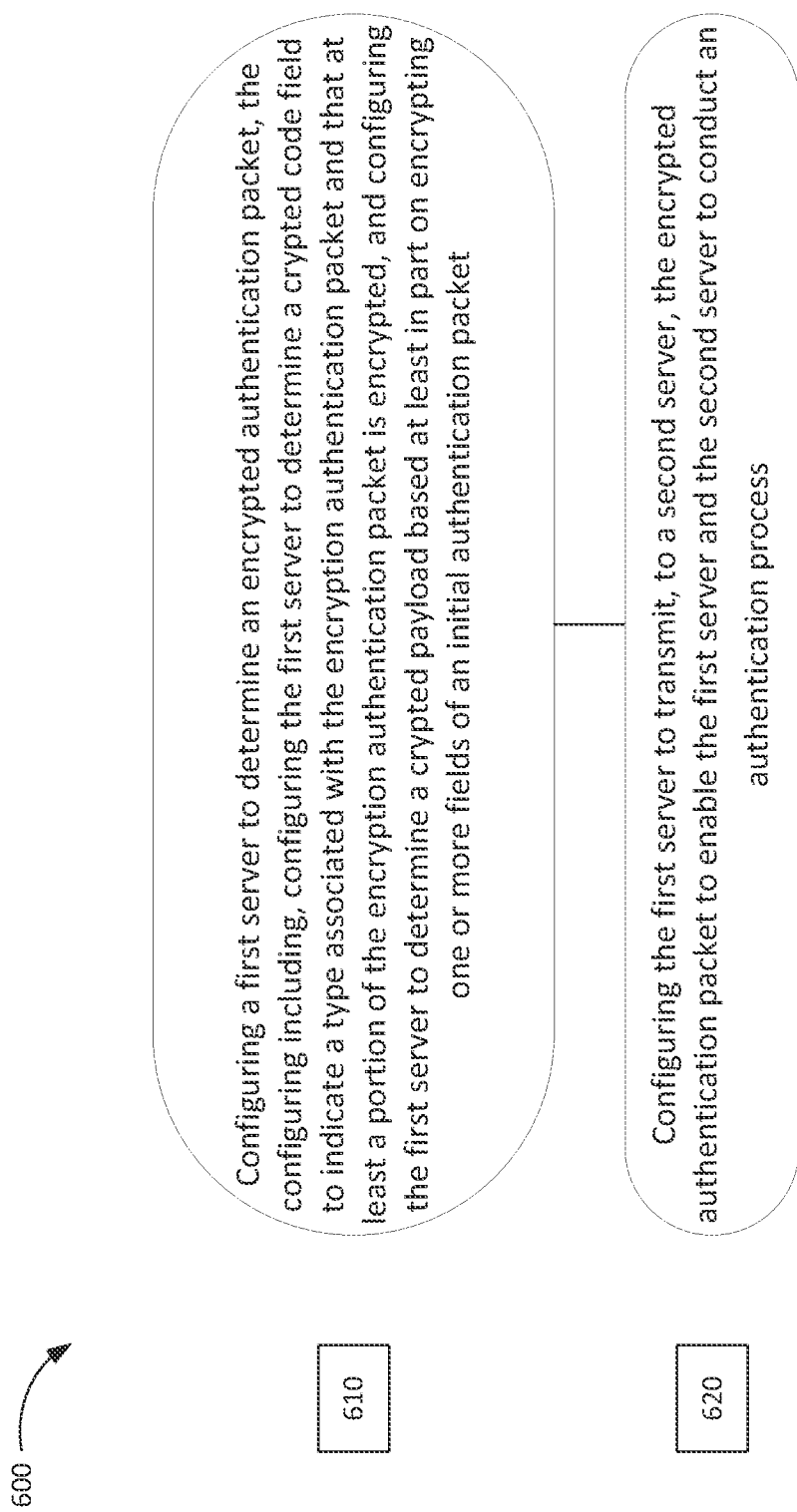

FIG. 6 is an illustration of an example process associated with an authentication scheme in a VPN, according to various aspects of the present disclosure.

Figure 7:
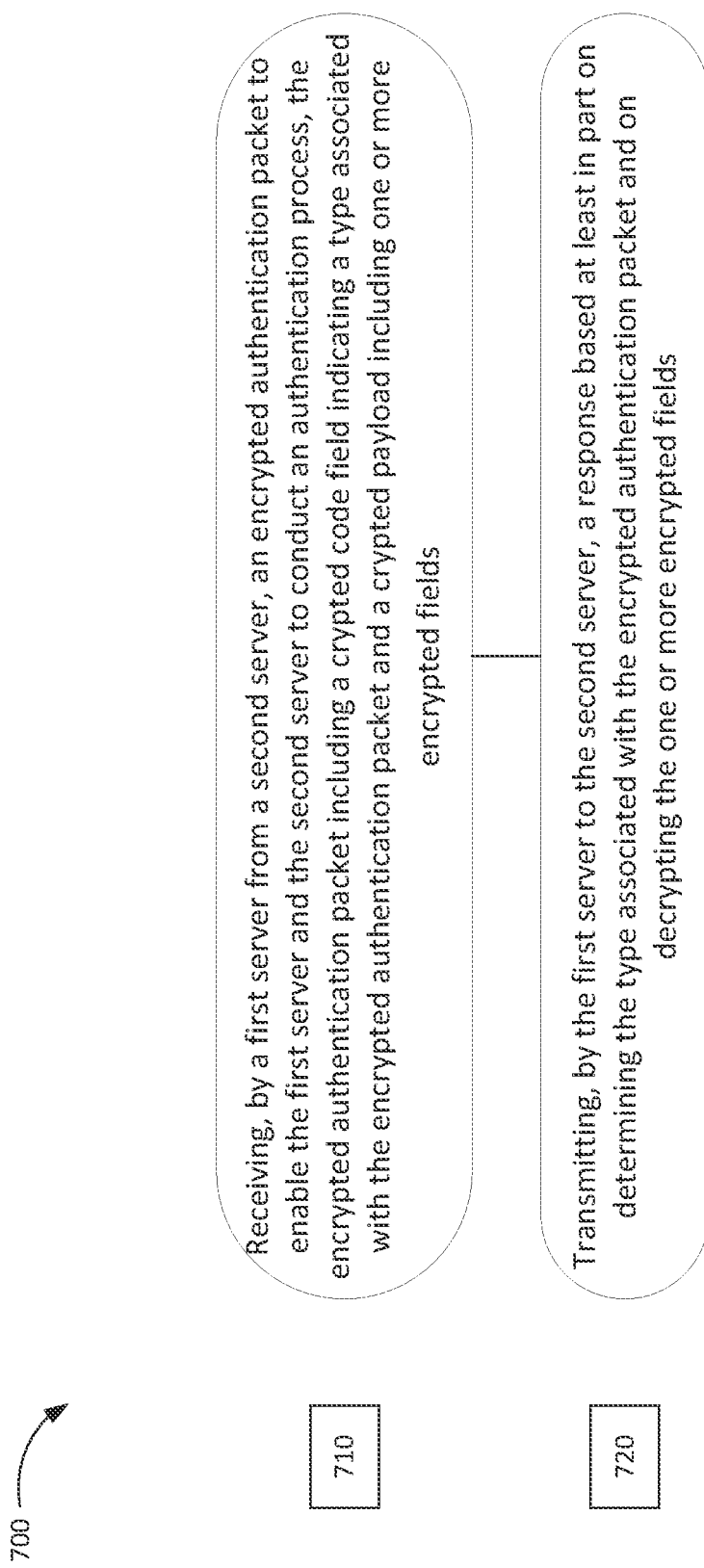

FIG. 7 is an illustration of an example process associated with an authentication scheme in a VPN, according to various aspects of the present disclosure.

Figure 8:
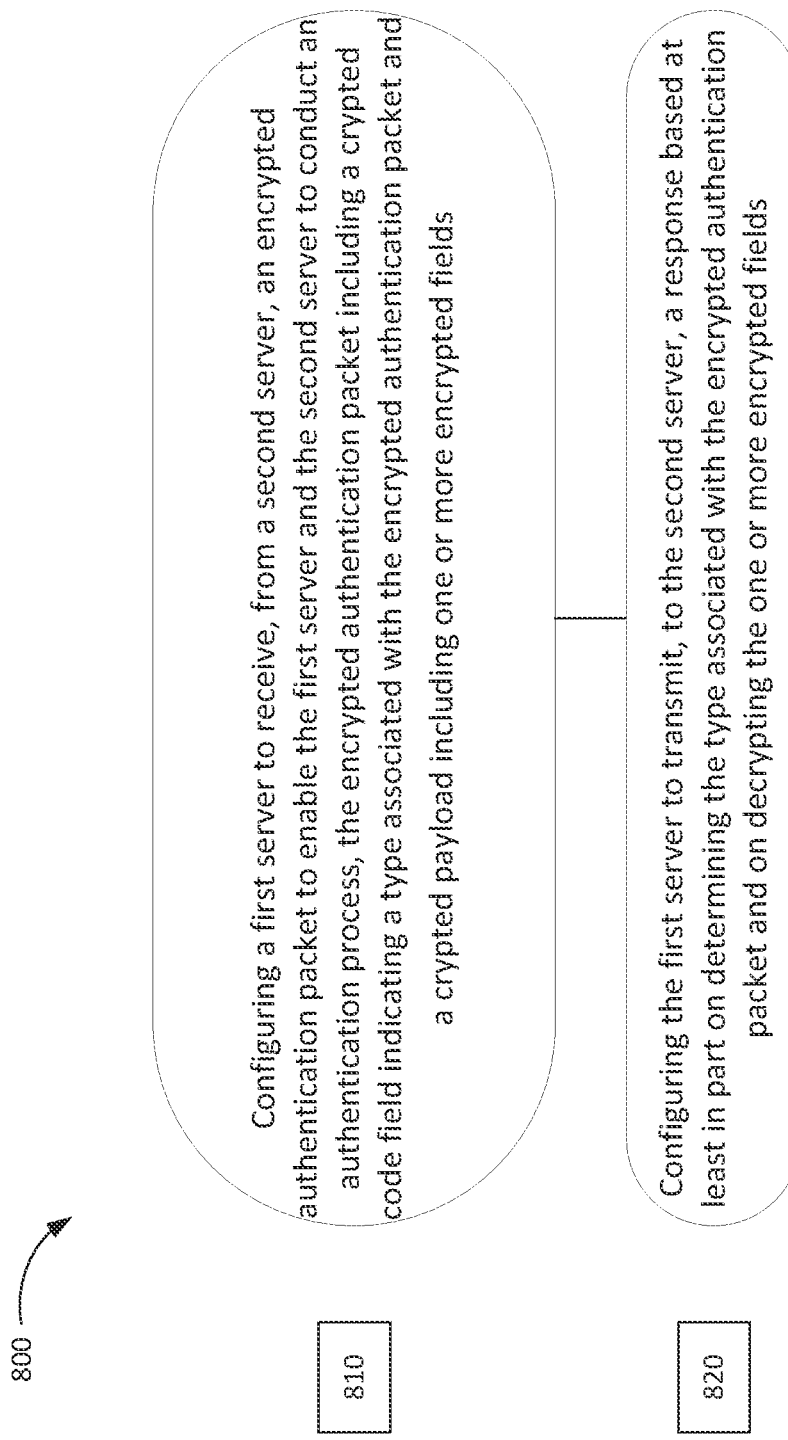

FIG. 8 is an illustration of an example process associated with an authentication scheme in a VPN, according to various aspects of the present disclosure.

FIG. 9 is an illustration of example devices associated with an authentication scheme in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with an authentication scheme in a VPN, according to various aspects of the present disclosure. Example 100 shows an architectural depiction of components included in system 100. In some aspects, the components may include a user device 102 capable of communicating with a VPN service provider (VSP) control infrastructure 104 and with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 114. The processing unit 110 may be capable of configuring and controlling operation of the one or more VPN servers 120. As further shown in FIG. 1, VPN server N 120 may be configured to communicate with an authentication server 118 over a network 116. Other VPN servers, from among the one or more VPN servers 120, may also be configured to communicate with the authentication server 118 in a similar and/or analogous manner. The processing unit 110 may be capable of configuring and controlling operation of the authentication server 118. In some aspects, network 116 may be similar to network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 114 may be any digital telecommunication network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

The user device 102 may transmit to the optimal VPN server an initiation request to establish a VPN connection (e.g., an encrypted tunnel) with the optimal VPN server. The optimal VPN server with which the user device establishes the encrypted tunnel may be referred to as a primary VPN server or an entry VPN server. Based at least in part on receiving the initiation request, the optimal VPN server may conduct a VPN authentication with the authentication server 118 to authenticate the user device 102 as a device that may receive the VPN services from the optimal VPN server. When the VPN authentication is successful, the optimal VPN server may proceed to provide the VPN services to the user device 120. Alternatively, when the VPN authentication fails, the optimal VPN server may refrain from providing the VPN services to the user device 120 and/or may communicate with the user device 120 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server 118 may include a piece of physical or virtual computer hardware and/or software capable of securely communicating with one or more VPN servers 120 for provision of authentication services.

One or more components (e.g., API 106, user database 108, processing unit 110, and/or server database 112) included in the VSP control infrastructure 104 and/or components (e.g., processing unit, memory, communication interface, etc.) included in the user device 102 and/or components (e.g., processing unit, memory, communication interface, etc.) may further be associated with a controller/processor, a memory, a communication interface, or a combination thereof (e.g., FIG. 9). For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit, utilizing an installed client application, a connection request and/or a user authentication request to an API associated with the VSP control infrastructure. Thereafter, the user device may undergo a user authentication process involving the API and a database associated with the VSP control infrastructure. Once authenticated, the VSP control infrastructure may determine a VPN server for providing the VPN services to the user device. The user device may utilize the client application to transmit an initiation request for establishing a VPN connection with the VPN server. Based at least in part on receiving the initiation request, the VPN server may communicate with the user device to establish the VPN connection and provide the VPN services.

Prior to communicating with the user device, the VPN server may conduct a VPN authentication with an authentication server. In an example, the VPN server may communicate with the authentication server to authenticate credentials associated with the user device. In another example, the VPN server may communicate with the authentication server to authenticate, for example, a VPN protocol to be utilized during the VPN connection with the user device. To conduct the VPN authentication, the VPN server and the authentication server may communicate data utilizing a remote authentication dial-in user service (RADIUS) protocol. Such data may include private information associated with the user device including, for example, a username and password, an Internet protocol (IP) address, and identity of a user of the user device, location of the user device, or the like.

In some cases, the private information associated with the user device may become compromised during the communication between the VPN server and the authentication server. For instance, the communication between the VPN server and the authentication server may be unencrypted and take place over the open Internet. Even when encryption is used, limited information (e.g., password) may be encrypted. On the open internet, the communication may be monitored and/or intercepted by a malicious third party. Such monitoring and/or interception may allow the malicious third party to discover and track the private information associated with the user. As a result, the private information associated with the user device may become compromised.

Also, the communication between the VPN server and the authentication server may result in inefficient utilization of resources. For instance, the communication may involve establishment and maintenance of a constant transmission control protocol (TCP) session between the VPN server and the authentication server for conducting VPN authentications associated with a plurality of user devices requesting VPN services from the VPN server. Alternatively, the VPN server and the authentication server may establish respective TCP sessions to conduct VPN authentications for every user device requesting the VPN services. In either situation, the VPN server and the authentication server may have to inefficiently expend a threshold amount of resources (e.g., computational resources, network bandwidth, management resources, processing resources, memory resources, power consumption, or the like) that may otherwise be utilized for performing more suitable tasks associated with providing the VPN services. Also, communicating utilizing the TCP sessions may introduce a delay because the authentication server may be responsible for participating in VPN authentications with respect to a plurality of VPN servers serving a plurality of user devices, and may take a threshold amount of time to communicate with the VPN server. For instance, the authentication server may take a threshold amount of time to transmit information to the VPN server and/or to respond to information received from the VPN server. As a result, a delay may be introduced in providing the VPN services to the user device.

Various aspects of systems and techniques discussed in the present disclosure provide an authentication scheme in a VPN. In some aspects, a VSP control infrastructure may configure a VPN server and/or an authentication server to utilize the authentication scheme to conduct VPN authentication for authenticating a user device requesting VPN services. The authentication scheme may include utilizing predetermined encryption and decryption algorithms to conduct the VPN authentication. In an example, the VPN server may utilize a predetermined encryption algorithm to encrypt at least a portion of an authentication packet transmitted to the authentication server. For instance, the VPN server may encrypt at least the portion of the authentication packet including private information associated with the user device. The authentication server may utilize a predetermined decryption algorithm to decrypt the encrypted portion of the authentication packet. Further, the authentication server may analyze the decrypted data to determine a result of the VPN authentication associated with the user device. In this way, by utilizing the authentication scheme discussed herein, the VPN server and the authentication server may deter monitoring and tracking of the private information by a malicious third party, thereby mitigating instances of the private information associated with the user device becoming compromised. Also, by utilizing the authentication scheme, the VPN server and the authentication server may avoid having to establish and maintain a constant TCP connection or respective TCP connections, thereby enabling efficient utilization of server resources (e.g., computational resources, network bandwidth, management resources, processing resources, memory resources, power consumption, or the like) for performing more suitable tasks associated with providing the VPN services. Further, the authentication scheme may enable the authentication server to speedily communicate with the VPN server, thereby mitigating any delay in providing the VPN services to the user device.

In some aspects, a system associated with a VPN may include a VPN server and an authentication server, the VPN server being configured to: determine an encrypted authentication packet based at least in part on utilizing an encryption key and a nonce to encrypt one or more fields of an initial authentication packet; and transmit, to an authentication server, the encrypted authentication packet to enable VPN authentication of a device requesting VPN services from the VPN server, and the authentication server being configured to: determine a response regarding the VPN authentication based at least in part on decrypting the one or more fields utilizing a decryption key and the nonce; and transmit, to the VPN server, the response regarding the VPN authentication.

FIG. 2 is an illustration of an example flow 200 associated with providing an authentication scheme in a VPN, according to various aspects of the present disclosure. FIG. 2 shows a VPN server 120 in communication with an authentication server 118. In some aspects, the communication may be related to conducting a VPN authentication (e.g., an authentication process) for authenticating a user device (e.g., user device 102) requesting VPN services from the VPN server 120. The VPN server 120 and the authentication server 118 may communicate over a network (e.g., network 116).

In some aspects, a VSP control infrastructure 104 may configure the VPN server 120 and/or the authentication server 118 to utilize a RADIUS protocol to conduct the VPN authentication. In an example, the VSP control infrastructure 104 may configure the VPN server 120 and/or the authentication server 118 to communicate utilizing RADIUS messages to conduct the VPN authentication. Also, the VSP control infrastructure 104 may configure predetermined encryption and decryption algorithms to be utilized by the VPN server 120 and/or the authentication server 118 to conduct the VPN authentication. Further, the VSP control infrastructure may determine a symmetric key to be utilized by the VPN server 120 and/or the authentication sever 118 to encrypt and decrypt data utilizing the predetermined encryption and decryption algorithms. In some aspects, the symmetric key may be a 256-bit cryptographic key.

As shown by reference numeral 210, based at least in part on receiving an initiation request from a user device, the VPN server 120 may determine an encrypted authentication packet to be transmitted to the authentication server 118 for the VPN authentication. In some aspects, the VPN server 120 may modify an initial authentication packet (e.g., a standard RADIUS packet) to determine the encrypted authentication packet. The initial authentication packet may be a packet as shown in FIG. 3A. Such an initial authentication packet may comprise a plurality of fields including, a code field (e.g., Code) starting at byte 1, an identifier field (e.g., Identifier) starting at byte 2, a data length field (e.g., Data Length) starting at byte 3, an authenticator field (e.g., Authenticator) starting at byte 5, and a payload field (e.g., Payload) starting at byte 21.

The code field may include bits, the values of which indicate a type associated with the initial authentication packet. Examples of types associated with initial authentication packets may include, for example, an access-request packet, an access-accept packet, an access-reject packet, an accounting-request packet, an accounting-response packet, and an access-challenge packet. The identifier field may include bits, the values of which indicate an identifier for matching responses from the authentication server 118 with requests transmitted by the VPN server 120 in the form of encrypted authentication packets. The data length field may include bits, the values of which indicate a length of the initial authentication packet in bits and/or bytes. The authenticator field may include bits, the values of which indicate information that may be used to validate responses from the authentication server 118. The payload field may include attribute value pairs (e.g., AVPs) carrying data associated with conducting the VPN authentication. Such data may include, for example, private information associated with the user device including, for example, account information associated with the user device such as a username and password, an Internet protocol (IP) address, identity of a user of the user device, location of the user device, or the like.

In an example, as shown in FIG. 3B, the determined encrypted authentication packet may include a crypted code field starting at byte 1, an identifier field starting at byte 2, a new data length field starting at byte 3, an authenticator field (when information included in the authenticator field is not encrypted) starting at byte 5, a nonce field starting at byte 5 or later, an authentication tag field starting at byte 17, and a crypted payload field starting at byte 29.

To determine the encrypted authentication packet, the VPN server 120 may determine the crypted code field. In some aspects, the crypted code field may include bits having newly defined and/or newly introduced values, which indicate to the authentication server 118 the type associated with the encrypted authentication packet and that at least a portion of the encrypted authentication packet has been encrypted. The VPN server 120 may encrypt data included in one or more fields associated with all types of packets. For instance, when the VPN server 120 encrypts data included in the payload field of, for example, the access-request packet, the crypted code field may include bits having newly defined and/or newly introduced values, which indicate that the encrypted authentication packet is an access-request packet with a portion of the access-request packet being encrypted (e.g., Access-Request-Crypted). Also, when the VPN server 120 encrypts information included in the authenticator field and the data included in the payload of, for example, the accounting-request packet, the crypted code field may include bits having newly defined and/or newly introduced values, which indicate that the encrypted authentication packet is an accounting-request packet with a portion of the accounting-request packet being encrypted (e.g., Accounting-Request-Crypted).

The VPN server 120 may also determine a nonce by determining a random alphanumeric string. In some aspects, the random alphanumeric may be, for example, 96 bits long and may be unique to the encrypted authentication packet. The VPN server 120 may determine a different nonce for each determined encrypted authentication packet. The VPN server 120 may receive the predetermined symmetric key from the VSP control infrastructure 104 to be utilized for encrypting at least the portion of the initial authentication packet. In some aspects, the VPN server 120 may predetermine the symmetric key and share the predetermined symmetric key with the VSP control infrastructure 104 and/or the authentication server 118.

Further, the VPN server 120 may determine the crypted payload field. In some aspects, the crypted payload field may include encrypted data. To determine the crypted payload field, the VPN server 120 may determine one or more fields of the initial authentication packet to be encrypted. In some aspects, the one or more fields may include, for example, the payload field. Encrypting the data included in the payload field may enable the VPN server 120 to maintain compatibility with the RADIUS protocol. In some aspects, the one or more deals may include, for example, the authenticator field and the payload field of the initial authentication packet. Encrypting the information included in the authenticator field and the data included in the payload field may enable the VPN server 120 to maintain compatibility with the RADIUS protocol.

Based at least in part on determining the nonce, the symmetric key (e.g., encryption key), and/or the one or more fields, the VPN server 120 may determine the encrypted data. In some aspects, the VPN server 120 may input the nonce, the symmetric key, and/or the one or more fields into a suitable encryption algorithm (e.g., ChaCha20_Poly1305 encryption algorithm) executed by the VPN server 120. The encryption algorithm may utilize the nonce and/or the symmetric key to encrypt the one or more fields. The output of the encryption algorithm may include the encrypted data, which the VPN server 120 may include in the crypted payload field. The output of the encryption algorithm may also include an authentication tag. In some aspects, the authentication tag may be a randomly generated string of alphanumeric characters that may enable the authentication server 118 to determine whether the encrypted authentication packet has been tampered with during communication between the VPN server 120 and the authentication server 118.

In some aspects, the VPN server 120 may include the nonce in the nonce field and the authentication tag in the authentication tag field, as shown in FIG. 3B. When the information included in the authenticator field is not encrypted, the VPN server 120 may include the authenticator field in the encrypted authentication packet. In this case, the authenticator field may be included at, for example, byte 5 of the encrypted authentication packet, and the nonce field and the authentication tag field may be included between the authenticator field and the crypted payload field.

Based at least in part on determining the crypted payload field, the VPN server 120 may determine the new data length field. In an example, the new data length field may include bits, the values of which indicate a length associated with the encrypted authentication packet. To determine the new data length, the VPN server 120 may calculate a length associated with the encrypted authentication packet in bits and/or bytes. In an example, the new data length may include a length associated with the crypted code field, a length associated with the identifier field, a length associated with the new data length field, a length associated with the authenticator field (when information included in the authenticator field is not encrypted), a length associated with the nonce field, a length associated with the authentication tag field, and a length associated with the crypted payload field. The calculated length of the encrypted authentication packet may be indicated by a value of bits included in the new data length field. In some aspects, the identifier field may remain unchanged with respect to the identifier field in the initial authentication packet.

Based at least in part on determining the crypted code field, the identifier field, the new data length field, the authenticator field (when information included in the authenticator field is not encrypted), the nonce field, the authentication tag field, and the crypted payload field, as discussed above, the VPN server 120 may determine the encrypted authentication packet.

Based at least in part on determining the encrypted authentication packet, as shown by reference numeral 220, the VPN server 120 may transmit, and the authentication server 118 may receive, the encrypted authentication packet.

As shown by reference numeral 230, the authentication server 118 may decrypt (the encrypted portion of) the encrypted authentication packet. For instance, based at least in part on receiving the encrypted authentication packet, the authentication server 118 may analyze the bits included in the crypted code field. In some aspects, the authentication server 118 may determine that one or more fields in the encrypted authentication packet is encrypted based at least in part on the values of the bits included in the crypted code field. As a result, the authentication server 118 may determine that the one or more encrypted fields in the encrypted authentication packet is to be decrypted. Further, the authentication server may determine a type of the encrypted authentication packet (e.g., Access-Request-Crypted, Accounting-Request-Crypted) based at least in part on the values of the bits included in the crypted code field.

To decrypt the one or more encrypted fields, the authentication server 118 may receive the predetermined symmetric key from the VSP control infrastructure 104 or may retrieve the predetermined symmetric key from, for example, a memory associated with the authentication server 118. The authentication server 118 may determine the nonce based at least in part on the nonce included in the nonce field of the encrypted authentication packet. In some aspects, the authentication server 118 may utilize the nonce included in the nonce field to decrypt the one or more encrypted fields. The authentication server 118 may also determine the authentication tag based at least in part on the authentication tag included in the authentication tag field of the encrypted authentication packet. Further, the authentication server 118 may determine the length associated with the encrypted authentication packet based at least in part on the values of bits included in the new data length field. In some aspects, the length associated with the encrypted authentication packet may indicate the length associated with all fields (e.g., sum of lengths associated with all fields) included in the encrypted authentication packet. The authentication server 118 may determine (e.g., locate) the crypted payload in the encrypted authentication packet based at least in part on determining a length associated with the crypted payload field. To determine a length associated with the crypted payload field (e.g., encrypted one or more fields), the authentication server 118 may subtract the length associated with the crypted code field, the length associated with the identifier field, the length associated with the new data length field, the length associated with the authenticator field (when information included in the authenticator field is not encrypted), the length associated with the nonce field, and the length associated with the authentication tag field from the length associated with the encrypted authentication packet. The authentication server 118 may extract the encrypted payload based at least in part on starting at the predetermined byte (e.g., byte 29) at which the crypted payload is included in the encrypted authentication packet for the determined length of the crypted payload. In this way, the authentication server 118 may determine the symmetric key, the nonce, the authentication tag, and the crypted payload.

In some aspects, the authentication server 118 may input the symmetric key, the nonce, the crypted payload, and the authentication tag into a suitable decryption algorithm (e.g., ChaCha20_Poly1305 decryption algorithm) executed by the authentication server 118. The decryption algorithm may analyze the authentication tag to determine whether the encrypted authentication packet was tampered with during communication between the VPN server 120 and the authentication server 118. When the decryption algorithm determines that the encrypted authentication packet was tampered with, the decryption algorithm outputs a result indicating the same to the authentication server 118. In this case, as shown by reference numeral 240, the authentication server 118 may determine a response by determining the encrypted response packet (e.g., Access-Reject-Crypted, Accounting-Reject-Crypted) indicating that the VPN authentication has failed. In some aspects, the authentication server 118 may determine the encrypted response packet in a similar way as the VPN server 120 determined the encrypted authentication packet. For instance, similar to the encrypted authentication packet, the encrypted response packet may include a crypted code field, an identifier field, a new data length field, an authenticator field (when the information included in the authenticator field is not encrypted), a nonce field, an authentication tag field, and a crypted payload field. The authentication server 118 may determine values of bits included in such fields in a similar way as discussed above with respect to the VPN server 120 determining values of bits included in fields of the encrypted authentication packet.

As shown by reference numeral 250, the authentication server 118 may transmit the encrypted response packet to the VPN server 120.

Alternatively, when the decryption algorithm determines that the encrypted authentication packet was not tampered with, the decryption algorithm may process the symmetric key, the nonce, and the crypted payload to output a decrypted payload (e.g., the decrypted one or more fields of the initial authentication packet). In an example, the decryption algorithm may output the decrypted data included in the payload field and the information included in the authenticator field (when the information included in the authenticator field is encrypted). Based at least in part on analyzing and/or processing the decrypted payload, as shown by reference numeral 240, the authentication server 118 may determine a response to the encrypted authentication packet received from the VPN server 120. In some aspects, as shown by reference numeral 250, the authentication server 118 may transmit the response to accept an access request or an accounting request from the VPN server 120 (e.g., Access-Accept-Crypted, Accounting-Accept-Crypted), or may reject the access request or the accounting request from the VPN server 120 (e.g., Access-Reject-Crypted, Accounting-Reject-Crypted), or may challenge (e.g., request additional information from the VPN server 120) the access request or the accounting request from the VPN server 120 (e.g., Access-Challenge-Crypted, Accounting-Challenge-Crypted), or may respond to the accounting request with an accounting response information (e.g., Accounting-Response-Crypted).

In some aspects, the decryption algorithm may analyze the authentication tag and process the symmetric key, the nonce and the encrypted payload sequentially or simultaneously. In some aspects, prior to analyzing/processing the decrypted payload and/or prior to determining the response, the authentication server 118 may reconstruct the initial authentication packet based at least in part on determining the code field, the identifier field, the data length field, the authenticator field, and the payload field based at least in part on decrypting the encrypted authentication packet. In this case, the authentication server 118 may refrain from adding the nonce and the authentication tag to the reconstructed initial authentication packet. Further, the authentication server 118 may determine the data length associated with the initial authentication packet based at least in part on a determined length of the code field, a determined length of the identifier field, a determined length of the authenticator field, and a determined length of the payload field. The authentication server 118 may process the reconstructed initial authentication packet to determine the response. As discussed previously, the authentication server 118 may determine the response in the form of the encrypted response packet.

In this way, by utilizing the authentication scheme discussed herein, a VPN server and an authentication server may deter monitoring and tracking of private information by a malicious third party, thereby mitigating instances of the private information associated with a user device becoming compromised. Also, by utilizing the authentication scheme, the VPN server and the authentication server may avoid having to establish and maintain a constant TCP connection or respective TCP connections, thereby enabling efficient utilization of server resources (e.g., computational resources, network bandwidth, management resources, processing resources, memory resources, power consumption, or the like) for performing more suitable tasks associated with providing the VPN services. As a result, the authentication scheme may enable the authentication server to speedily communicate with the VPN server, thereby mitigating any delay in providing the VPN services to the user device.

Although the authentication process is described as being a VPN authentication process taking place between a VPN server and an authentication server in a VPN environment, the present disclosure contemplates the authentication process to include any authentication process taking place between two devices in any environment.

As indicated above, FIGS. 2 and 3A-B are provided as examples. Other examples may differ from what is described with regard to FIGS. 2 and 3A-B.

FIG. 4 is an illustration of an example process 400 associated with an authentication scheme in a VPN, according to various aspects of the present disclosure. In some aspects, the process 400 may be performed by a processor/controller (e.g., processor 920) associated with a VPN server (e.g., VPN server 120) and/or a processor/controller (e.g., processor 920) associated with an authentication server (e.g., authentication server 118). As shown by reference numeral 410, process 400 includes determining, by a VPN server, an encrypted authentication packet based at least in part on utilizing an encryption key and a nonce to encrypt one or more fields of an initial authentication packet. For instance, the VPN server may utilize the associated processor/controller to determine an encrypted authentication packet based at least in part on utilizing an encryption key and a nonce to encrypt one or more fields of an initial authentication packet, as discussed elsewhere herein.

As shown by reference numeral 420, process 400 includes transmitting, by the VPN server to an authentication server, the encrypted authentication packet to enable VPN authentication of a device requesting VPN services from the VPN server. For instance, the VPN server may utilize an associated communication interface (e.g., communication interface 970) and the associated processor/controller to transmit, to an authentication server, the encrypted authentication packet to enable VPN authentication of a device requesting VPN services from the VPN server, as discussed elsewhere herein.

As shown by reference numeral 430, process 400 includes determining, by the authentication server, a response regarding the VPN authentication based at least in part on decrypting the one or more fields utilizing a decryption key and the nonce. For instance, the authentication server may utilize the associated processor/controller to determine a response regarding the VPN authentication based at least in part on decrypting the one or more fields utilizing a decryption key and the nonce, as discussed elsewhere herein.

As shown by reference numeral 440, process 400 includes transmitting, by the authentication server to the VPN server, the response regarding the VPN authentication. For instance, the authentication server may utilize the associated communication interface (e.g., communication interface 970) and the associated processor/controller to transmit, to the VPN server, the response regarding the VPN authentication, as discussed elsewhere herein.

Process 400 may include additional aspects, such as any single aspect or any combination of aspects described below and/or in connection with one or more other processes described elsewhere herein.

In a first aspect, in process 400, the encrypted authentication packet includes a crypted code field indicating a type associated with the encrypted authentication packet and that the one or more fields are encrypted.

In a second aspect, alone or in combination with the first aspect, in process 400, the encrypted authentication packet includes an authentication tag to enable the authentication server to determine whether the encrypted authentication packet is tampered.

In a third aspect, alone or in combination with the first through second aspects, in process 400, the one or more fields include a payload field including private information associated with the device requesting the VPN services from the VPN server.

In a fourth aspect, alone or in combination with the first through third aspects, in process 400, the one or more fields include a payload field including private information associated with the device requesting the VPN services from the VPN server and an authenticator field including information associated with validating the response from the authentication server.

In a fifth aspect, alone or in combination with the first through fourth aspects, in process 400, the encrypted authentication packet includes a data length field indicating a length associated with the encrypted authentication packet.

In a sixth aspect, alone or in combination with the first through fifth aspects, in process 400, the encryption key is the same as the decryption key.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with an authentication scheme in a VPN, according to various aspects of the present disclosure. In some aspects, the process 500 may be performed by a processor/controller (e.g., processor 920) associated with a VPN server (e.g., VPN server 120). As shown by reference numeral 510, process 500 includes determining, by a first server, an encrypted authentication packet, the determining including, determining a crypted code field to indicate a type associated with the encryption authentication packet and that at least a portion of the encryption authentication packet is encrypted, and determining a crypted payload based at least in part on encrypting one or more fields of an initial authentication packet. For instance, the VPN server may utilize the associated processor/controller to determine an encrypted authentication packet, the determining including, determining a crypted code field to indicate a type associated with the encryption authentication packet and that at least a portion of the encryption authentication packet is encrypted, and determining a crypted payload based at least in part on encrypting one or more fields of an initial authentication packet, as discussed elsewhere herein.

As shown by reference numeral 520, process 500 includes transmitting, by the first server to a second server, the encrypted authentication packet to enable the first server and the second server to conduct an authentication process. For instance, the VPN server may utilize an associated communication interface (e.g., communication interface 970) and the associated processor/controller to transmit, to a second server, the encrypted authentication packet to enable the first server and the second server to conduct an authentication process, as discussed elsewhere herein.

Process 500 may include additional aspects, such as any single aspect or any combination of aspects described below and/or in connection with one or more other processes described elsewhere herein.

In a first aspect, in process 500, determining the encrypted authentication packet includes determining a data length field indicating a length associated with the encrypted authentication packet, the length to be utilized by the second server to determine the crypted payload.

In a second aspect, alone or in combination with the first aspect, in process 500, determining the encrypted authentication packet includes determining an authentication tag field including information to enable the second server to determine whether the encrypted authentication packet is tampered.

In a third aspect, alone or in combination with the first through second aspects, in process 500, the one or more fields includes a payload field including information associated with a device requesting a service from the first server.

In a fourth aspect, alone or in combination with the first through third aspects, in process 500, the one or more fields includes a payload field including information associated with a device requesting a service from the first server and an authenticator field including information associated with validating a response to be received from the second server.

In a fifth aspect, alone or in combination with the first through fourth aspects, in process 500, determining the crypted payload includes encrypting the one or more fields based at least in part on utilizing a symmetric encryption key and a nonce.

In a sixth aspect, alone or in combination with the first through fifth aspects, in process 500, the encrypted authentication packet is associated with a remote authentication dial-in user service (RADIUS) protocol.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with an authentication scheme in a VPN, according to various aspects of the present disclosure. In some aspects, the process 600 may be performed by a processor/controller (e.g., processing unit 110 and/or processor 920) associated with a VSP control infrastructure (e.g., VSP control infrastructure 104). As shown by reference numeral 610, process 600 includes configuring a first server to determine an encrypted authentication packet, the configuring including, configuring the first server to determine a crypted code field to indicate a type associated with the encryption authentication packet and that at least a portion of the encryption authentication packet is encrypted, and configuring the first server to determine a crypted payload based at least in part on encrypting one or more fields of an initial authentication packet. For instance, the VSP control infrastructure may utilize the associated processor/controller to configure a first server to determine an encrypted authentication packet, the configuring including, configuring the first server to determine a crypted code field to indicate a type associated with the encryption authentication packet and that at least a portion of the encryption authentication packet is encrypted, and configuring the first server to determine a crypted payload based at least in part on encrypting one or more fields of an initial authentication packet, as discussed elsewhere herein.

As shown by reference numeral 620, process 600 includes configuring the first server to transmit, to a second server, the encrypted authentication packet to enable the first server and the second server to conduct an authentication process. For instance, the VSP control infrastructure may utilize the associated processor/controller to configure the first server to transmit, to a second server, the encrypted authentication packet to enable the first server and the second server to conduct an authentication process, as discussed elsewhere herein.

Process 600 may include additional aspects, such as any single aspect or any combination of aspects described below and/or in connection with one or more other processes described elsewhere herein.

In a first aspect, in process 600, configuring the first server to determine the encrypted authentication packet includes configuring the first server to determine a data length field indicating a length associated with the encrypted authentication packet, the length to be utilized by the second server to determine the crypted payload.

In a second aspect, alone or in combination with the first aspect, in process 600, configuring the first server to determine the encrypted authentication packet includes configuring the first server to determine an authentication tag field including information to enable the second server to determine whether the encrypted authentication packet is tampered.

In a third aspect, alone or in combination with the first through second aspects, in process 600, the one or more fields includes a payload field including information associated with a device requesting a service from the first server.

In a fourth aspect, alone or in combination with the first through third aspects, in process 600, the one or more fields includes a payload field including information associated with a device requesting a service from the first server and an authenticator field including information associated with validating a response to be received from the second server.

In a fifth aspect, alone or in combination with the first through fourth aspects, in process 600, configuring the first server to determine the crypted payload includes configuring the first server to encrypt the one or more fields based at least in part on utilizing a symmetric encryption key and a nonce.

In a sixth aspect, alone or in combination with the first through fifth aspects, in process 600, the encrypted authentication packet is associated with a remote authentication dial-in user service (RADIUS) protocol.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with an authentication scheme in a VPN, according to various aspects of the present disclosure. In some aspects, the process 700 may be performed by a processor/controller (e.g., processor 920) associated with an authentication server (e.g., authentication server 118). As shown by reference numeral 710, process 700 includes receiving, by a first server from a second server, an encrypted authentication packet to enable the first server and the second server to conduct an authentication process, the encrypted authentication packet including a crypted code field indicating a type associated with the encrypted authentication packet and a crypted payload including one or more encrypted fields. For instance, the authentication server may utilize an associated communication interface (e.g., communication interface 970) and the associated processor/controller to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields, as discussed elsewhere herein.

As shown by reference numeral 720, process 700 includes transmitting, by the first server to the second server, a response based at least in part on determining the type associated with the encrypted authentication packet and on decrypting the one or more encrypted fields. For instance, the authentication server may utilize the associated communication interface and the associated processor/controller to transmit, to the second server, a response based at least in part on determining the type associated with the encrypted authentication packet and on decrypting the one or more encrypted fields, as discussed elsewhere herein.

Process 700 may include additional aspects, such as any single aspect or any combination of aspects described below and/or in connection with one or more other processes described elsewhere herein.

In a first aspect, process 700 may include determining, by the first server, the crypted payload based at least in part on determining a data length associated with the encrypted authentication packet.

In a second aspect, alone or in combination with the first aspect, process 700 may include determining, by the first server, whether the encrypted authentication packet is tampered based at least in part on determining information indicated by an authentication tag included in the encrypted authentication packet.

In a third aspect, alone or in combination with the first through second aspects, in process 700, the one or more encrypted fields includes a payload field including information associated with a user device requesting a service from the second server.

In a fourth aspect, alone or in combination with the first through third aspects, in process 700, the one or more encrypted fields includes a payload field including information associated with a user device requesting a service from the second server and an authenticator field including information associated with validating the response.

In a fifth aspect, alone or in combination with the first through fourth aspects, in process 700, decrypting the one or more encrypted fields includes decrypting the one or more encrypted fields based at least in part on utilizing a symmetric decryption key and a nonce.

In a sixth aspect, alone or in combination with the first through fifth aspects, in process 700, the response includes an encrypted response authentication packet associated with a remote authentication dial-in user service (RADIUS) protocol.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of an example process 800 associated with an authentication scheme in a VPN, according to various aspects of the present disclosure. In some aspects, the process 800 may be performed by a processor/controller (e.g., processing unit 110 and/or processor 920) associated with a VSP control infrastructure (e.g., VSP control infrastructure 104). As shown by reference numeral 810, process 800 includes configuring a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields. For instance, the VSP control infrastructure may utilize the associated processor/controller to configure a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields, as discussed elsewhere herein.

As shown by reference numeral 820, process 800 includes configuring the first server to transmit, to the second server, a response based at least in part on determining the type associated with the encrypted authentication packet and on decrypting the one or more encrypted fields. For instance, the VSP control infrastructure may utilize the associated processor/controller to configure the first server to transmit, to the second server, a response based at least in part on determining the type associated with the encrypted authentication packet and on decrypting the one or more encrypted fields, as discussed elsewhere herein.

Process 800 may include additional aspects, such as any single aspect or any combination of aspects described below and/or in connection with one or more other processes described elsewhere herein.

In a first aspect, process 800 may include configuring the first server to determine the crypted payload based at least in part on determining a data length associated with the encrypted authentication packet.

In a second aspect, alone or in combination with the first aspect, process 800 may include configuring the first server to determine whether the encrypted authentication packet is tampered based at least in part on determining information indicated by an authentication tag included in the encrypted authentication packet.

In a third aspect, alone or in combination with the first through second aspects, in process 800, the one or more encrypted fields includes a payload field including information associated with a user device requesting a service from the second server.

In a fourth aspect, alone or in combination with the first through third aspects, in process 800, the one or more encrypted fields includes a payload field including information associated with a user device requesting a service from the second server and an authenticator field including information associated with validating the response.

In a fifth aspect, alone or in combination with the first through fourth aspects, in process 800, configuring the first server to decrypt the one or more encrypted fields includes configuring the first server to decrypt the one or more encrypted fields based at least in part on utilizing a symmetric decryption key and a nonce.

In a sixth aspect, alone or in combination with the first through fifth aspects, in process 800, the response includes an encrypted response authentication packet associated with a remote authentication dial-in user service (RADIUS) protocol.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

FIG. 9 is an illustration of example devices 900, according to various aspects of the present disclosure. In some aspects, the example devices 900 may form part of or implement the systems, environments, infrastructures, components, or the like described elsewhere herein (e.g., FIG. 1 and/or FIG. 2) and may be used to perform the processes described with respect to FIGS. 3 and 4. The example devices 900 may include a universal bus 910 communicatively coupling a processor 920, a memory 930, a storage component 940, an input component 950, an output component 960, and a communication interface 970.

Bus 910 may include a component that permits communication among multiple components of a device 900. Processor 920 may be implemented in hardware, firmware, and/or a combination of hardware and software. Processor 920 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 920 may include one or more processors capable of being programmed to perform a function. Memory 930 may include a random access memory (RAM), a read only memory (ROM), and/or another type of dynamic or static storage device (e.g., a flash memory, a magnetic memory, and/or an optical memory) that stores information and/or instructions for use by processor 920.

Storage component 940 may store information and/or software related to the operation and use of a device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 may include a component that permits a device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 may include a component that provides output information from device 900 (via, for example, a display, a speaker, a haptic feedback component, an audio or visual indicator, and/or the like).

Communication interface 970 may include a transceiver-like component (e.g., a transceiver, a separate receiver, a separate transmitter, and/or the like) that enables a device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

A device 900 may perform one or more processes described elsewhere herein. A device 900 may perform these processes based on processor 920 executing software instructions stored by a non-transitory computer-readable medium, such as memory 930 and/or storage component 940. As used herein, the term "computer-readable medium" may refer to a non-transitory memory device. A memory device may include memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 9 are provided as an example. In practice, a device 900 may include additional components, fewer components, different components, or differently arranged components than those shown in FIG. 9. Additionally, or alternatively, a set of components (e.g., one or more components) of a device 900 may perform one or more functions described as being performed by another set of components of a device 900.

As indicated above, FIG. 9 is provided as an example. Other examples may differ from what is described with regard to FIG. 9.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    configuring, by an infrastructure device, a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields; and
    configuring, by the infrastructure device, the first server to transmit, to the second server, a response based at least in part on determining the type associated with the encrypted authentication packet and on decrypting the one or more encrypted fields.

2. The method of claim 1, further comprising:
    configuring the first server to determine the crypted payload based at least in part on determining a data length associated with the encrypted authentication packet.

3. The method of claim 1, further comprising:
    configuring the first server to determine whether the encrypted authentication packet is tampered based at least in part on determining information indicated by an authentication tag included in the encrypted authentication packet.

4. The method of claim 1, wherein the one or more encrypted fields includes a payload field including information associated with a user device requesting a service from the second server.

5. The method of claim 1, wherein the one or more encrypted fields includes a payload field including information associated with a user device requesting a service from the second server and an authenticator field including information associated with validating the response.

6. The method of claim 1, wherein configuring the first server to decrypt the one or more encrypted fields includes configuring the first server to decrypt the one or more encrypted fields based at least in part on utilizing a symmetric decryption key and a nonce.

7. The method of claim 1, wherein the response includes an encrypted response authentication packet associated with a remote authentication dial-in user service (RADIUS) protocol.

8. An infrastructure device, comprising:
    a memory; and
    a processor communicatively coupled to the memory, the memory and the processor being configured to:
    configure a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields; and
    configure the first server to transmit, to the second server, a response based at least in part on determining the type associated with the encrypted authentication packet and on decrypting the one or more encrypted fields.

9. The infrastructure device of claim 8, wherein the memory and the processor are configured to configure the first server to determine the crypted payload based at least in part on determining a data length associated with the encrypted authentication packet.

10. The infrastructure device of claim 8, wherein the memory and the processor are configured to configure the first server to determine whether the encrypted authentication packet is tampered based at least in part on determining information indicated by an authentication tag included in the encrypted authentication packet.

11. The infrastructure device of claim 8, wherein the one or more encrypted fields includes a payload field including information associated with a user device requesting a service from the second server.

12. The infrastructure device of claim 8, wherein the one or more encrypted fields includes a payload field including information associated with a user device requesting a service from the second server and an authenticator field including information associated with validating the response.

13. The infrastructure device of claim 8, wherein, to decrypt the one or more encrypted fields, the memory and the processor are configured to configure the first server to decrypt the one or more encrypted fields based at least in part on utilizing a symmetric decryption key and a nonce.

14. The infrastructure device of claim 8, wherein the response includes an encrypted response authentication packet associated with a remote authentication dial-in user service (RADIUS) protocol.

15. A non-transitory computer-readable medium configured to store instructions, which when executed by a processor associated with an infrastructure device, configure the processor to:
   configure a first server to receive, from a second server, an encrypted authentication packet to enable the first server and the second server to conduct an authentication process, the encrypted authentication packet including a crypted code field indicating a type associated with the encrypted authentication packet and a crypted payload including one or more encrypted fields; and
   configure the first server to transmit, to the second server, a response based at least in part on determining the type associated with the encrypted authentication packet and on decrypting the one or more encrypted fields.

16. The non-transitory computer-readable medium of claim 15, wherein the processor is configured to configure the first server to determine the crypted payload based at least in part on determining a data length associated with the encrypted authentication packet.

17. The non-transitory computer-readable medium of claim 15, wherein the processor is configured to configure the first server to determine whether the encrypted authentication packet is tampered based at least in part on determining information indicated by an authentication tag included in the encrypted authentication packet.

18. The non-transitory computer-readable medium of claim 15, wherein the one or more encrypted fields include a payload field including information associated with a user device requesting a service from the second server.

19. The non-transitory computer-readable medium of claim 15, wherein the one or more encrypted fields include a payload field including information associated with a user device requesting a service from the second server and an authenticator field including information associated with validating the response.

20. The non-transitory computer-readable medium of claim 15, wherein, to decrypt the one or more encrypted fields, the processor is configured to configure the first server to decrypt the one or more encrypted fields based at least in part on utilizing a symmetric decryption key and a nonce.

* * * * *